United States Patent [19]

Hölter

[11] Patent Number: 5,476,536
[45] Date of Patent: Dec. 19, 1995

[54] PROCESS FOR REMOVING HARMFUL HYDROCARBONS, PARTICULARLY PLANT PROTECTIVE AEROSOLS AND VAPORS, FROM THE FRESH AIR SUPPLIED TO A VEHICLE CABIN

[75] Inventor: Heinz Hölter, Gladbeck, Germany

[73] Assignee: Hölter GmbH, Gladbeck, Germany

[21] Appl. No.: 211,290

[22] PCT Filed: Jul. 30, 1993

[86] PCT No.: PCT/DE93/00670

§ 371 Date: Mar. 30, 1994

§ 102(e) Date: Mar. 30, 1994

[87] PCT Pub. No.: WO94/03262

PCT Pub. Date: Feb. 17, 1994

[30] Foreign Application Priority Data

Aug. 10, 1992 [DE] Germany .................. 42 26 382.4

[51] Int. Cl.$^6$ .................. B01D 47/06; B01D 51/10
[52] U.S. Cl. .................. 95/42; 95/214; 95/228; 95/237; 95/288
[58] Field of Search .................. 95/10, 42, 214, 95/223, 228, 237, 257, 288; 55/222, 257.7, 356, 385.3

[56] References Cited

U.S. PATENT DOCUMENTS

| | | | |
|---|---|---|---|
| 2,019,291 | 10/1935 | Brace et al. | 95/10 |
| 2,112,392 | 3/1938 | Bichowsky | 55/222 X |
| 2,303,331 | 12/1942 | Dauphinee | 95/10 |
| 2,372,309 | 3/1945 | Bichowsky | 95/10 X |
| 2,379,518 | 7/1945 | Hall | 95/288 X |
| 3,440,804 | 4/1969 | Gleockler | 55/385.3 X |
| 3,473,298 | 10/1969 | Berman | 55/257.7 X |
| 3,868,896 | 3/1975 | Doll et al. | 55/385.3 X |
| 3,960,992 | 6/1976 | Cyrenne | 55/222 X |
| 4,031,030 | 6/1977 | Rudolph | 55/222 X |
| 4,078,390 | 3/1978 | Duvall | 95/42 X |
| 4,141,702 | 2/1979 | de Vries | 55/257.7 X |
| 4,194,889 | 3/1980 | Wanner | 55/257.7 X |
| 4,469,490 | 9/1984 | Wilson | 55/385.3 X |
| 4,684,381 | 8/1987 | Wasylyniuk | 55/385.3 X |
| 5,004,487 | 4/1991 | Kowalczyk | 55/385.3 X |

FOREIGN PATENT DOCUMENTS

| | | |
|---|---|---|
| 120753 | 10/1984 | European Pat. Off. . |
| 0236281 | 9/1987 | European Pat. Off. .................. 55/222 |
| 280942 | 9/1988 | European Pat. Off. . |
| 3712209 | 10/1988 | Germany . |
| 39074377 | 7/1989 | Germany . |
| 4013409 | 10/1991 | Germany . |
| 4038699 | 6/1992 | Germany . |
| 4040340 | 7/1992 | Germany . |
| 63-042715 | 2/1988 | Japan .................. 95/228 |

*Primary Examiner*—Robert Spitzer
*Attorney, Agent, or Firm*—James C. Wray

[57] ABSTRACT

The present invention relates to a process for removing harmful hydrocarbons, particularly plant protective aerosols and vapors, from the fresh air supplied to a vehicle cabin. The loaded fresh air is subjected to a partial condensation with subsequent phase separation. The fresh air is cooled below the dew point of the components to be removed in a type of cold trap. It has a device for collecting and draining the obtained condensate. A standard cooling plant may be installed for providing the cold necessary for partial condensation. If the vehicle is already equipped with an air conditioning system, then the cooling necessary for partial condensation is tapped directly from the air conditioner cycle. It is possible for the fresh air stream to be passed over the evaporator of the air conditioner. The cold air stream present following the removal of the condensate can be warmed in heat exchange with fresh air which is to be cooled prior to its further release into the vehicle cabin. This prevents an overcooling of the vehicle cabin.

14 Claims, 1 Drawing Sheet

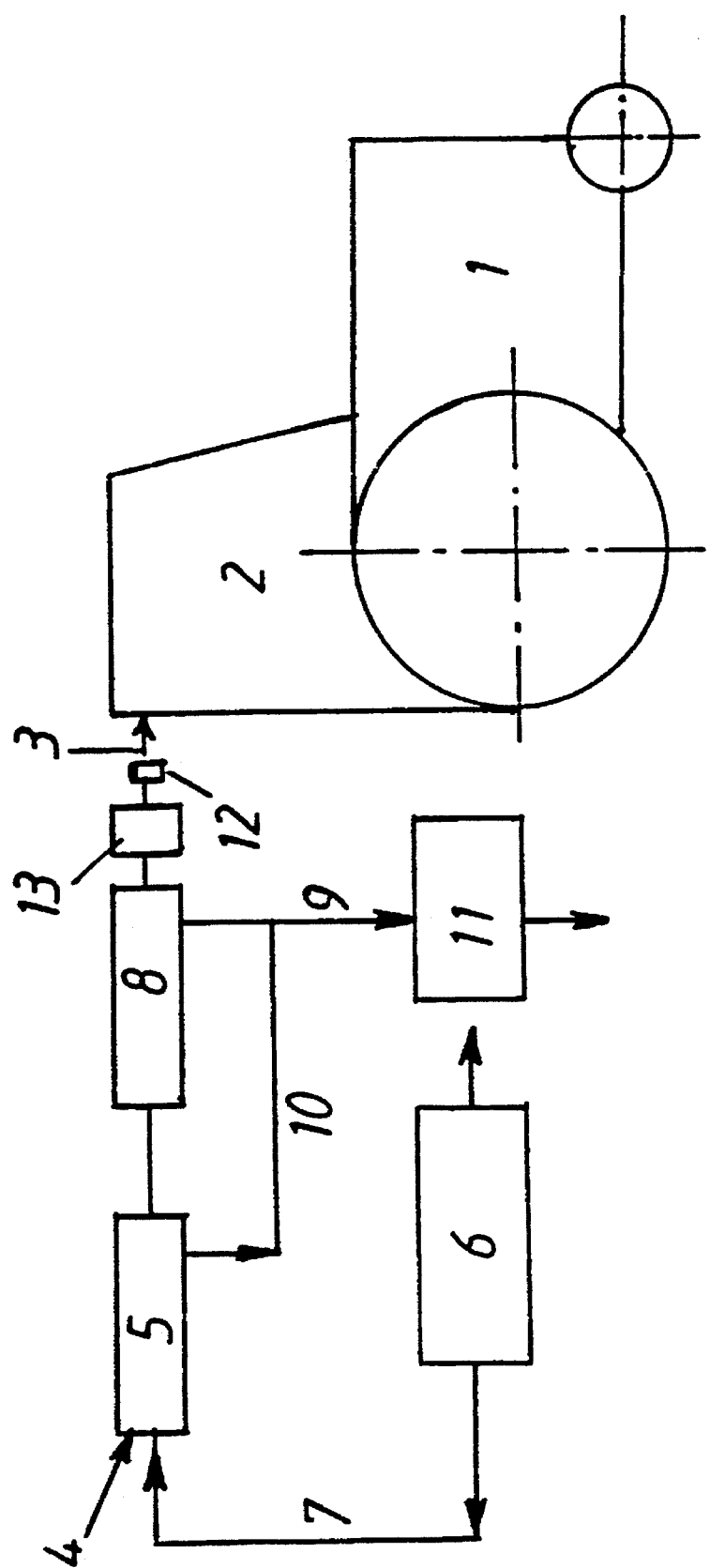

PROCESS FOR REMOVING HARMFUL HYDROCARBONS, PARTICULARLY PLANT PROTECTIVE AEROSOLS AND VAPORS, FROM THE FRESH AIR SUPPLIED TO A VEHICLE CABIN

BACKGROUND OF THE INVENTION

The invention relates to a process for removing harmful hydrocarbons, particularly plant protective aerosols and vapors, from the fresh air supplied to a vehicle cabin.

Modern tractors used currently in agriculture have, in most cases, a closed vehicle cabin. These vehicle cabins are constructed in a sound-insulating manner and usually are already connected to an air conditioning system.

Especially when plant protectives, usually pesticides or herbicides, such as atrazine, bromacil or propazine, are sprayed, it is disadvantageous that aerosols or vapors of such plant protectives are passed along into the vehicle cabin together with the fresh air that flows in and thus may have a negative or harmful effect on the health of the vehicle operator, particularly during a longer spraying operation.

It has already been suggested that air loaded with harmful hydrocarbons in smaller work spaces, e.g. cabins or work places, etc., be cleaned with active carbon filters. But the disadvantage of the use of such filters is, however, that the cleaning effect decreases greatly with an increasing load, and the complete removal of the hazardous toxic substances is no longer ensured. In addition, the disposal of the loaded active carbon filters themselves also poses problems.

SUMMARY OF THE INVENTION

The invention is based on the task of developing a simple and economical process for removing harmful hydrocarbons, particularly plant protective aerosols and vapors, from the fresh air supplied to a vehicle cabin.

According to the invention, this task is solved in that the loaded fresh air is subjected to a partial condensation with subsequent phase separation.

The process according to the invention makes it possible, in a simple manner and without generating loaded waste substances, to remove the harmful hydrocarbons from the fresh air stream of the vehicle cabin. It is only necessary to construct a type of cold trap in which the fresh air is cooled below the dew point of the components to be removed and which possesses a device for collecting and draining the obtained condensate. A standard cooling plant may be installed for providing the cold necessary for partial condensation.

According to another characteristic of the invention, if the vehicle is already equipped with an air conditioning system, it is found to be very advantageous that the cold necessary for partial condensation is coupled directly from the air conditioner cycle. It is e.g. possible that the fresh air stream is simply passed over the evaporator of the air conditioner.

Depending on the individually necessary degree of cooling of the fresh air, it may be economically sensible according to another characteristic of the invention that, in order to avoid cooling losses, the cold air stream present following the removal of the condensate is prior to its further conduit into the vehicle cabin warmed in heat exchange with fresh air which is to be cooled. This would also prevent an overcooling of the vehicle cabin.

It was found that the process of the invention is particularly advantageous in connection with a gas washing level which precedes the partial condensation and phase separation and is operated with water as a washing medium which may be taken e.g. from the fresh water tank of the plant protective spraying system. In the gas washing level, a large part of the entrained plant protective aerosols and vapors is already removed from the fresh air stream, so that the following, further treatment level is accordingly relieved. In addition, the entrained water vapor from the gas washing level causes water drops to form during the partial condensation, into which water drops the harmful plant protective particles are absorbed, so that the effectiveness of the removal is increased even more.

Further explanations regarding the invention are found in the embodiment which is shown schematically in the figure.

BRIEF DESCRIPTION OF THE DRAWING

The figure shows a tractor used for spraying plant protectives.

DETAILED DESCRIPTION OF THE DRAWING

The figure shows a tractor 1 used for spraying plant protectives and having a vehicle cabin 2 which is supplied via a conduit 3 with cleaned fresh air. For cleaning, the fresh air which flows in via conduit 4 and is loaded with plant protective aerosols and vapors is first intimately mixed in a high performance gas washing level 5 with washing water supplied via a conduit 7 from a fresh water tank 6, whereby a large part of the harmful aerosols and vapors is already absorbed into corresponding water drops. By exploiting the different inertias of gas and condensate, the phases are then separated again inside the high performance gas washing level.

The fresh air is further cleaned in a second cleaning level 8 which is constructed as a so-called cold trap. Here the air enriched with residual amounts of aerosols and vapors as well as water vapor is first partially condensed by adding cold, and then undergoes phase separation. The condensate containing the harmful substances is collected, e.g. in the bottom of a separating container, and is passed via a conduit 9 together with the condensate from the gas washing level 5 which flows in via a conduit 10 into a container 11 for the plant protective solution to be sprayed.

If necessary, e.g. because of safety reasons, the clean fresh air leaving the cleaning level 8 may still be passed over a so-called safety filter 13 prior to being supplied to the vehicle cabin.

A hygrometer 12 registers the residual moisture content of the cleaned air. A large increase in the moisture content may e.g. indicate malfunctions in the system which could be caused by a breaking through of the drops in the gas washing level 5 or too low of a cold supply in the cleaning level 8.

I claim:

1. A process for removing harmful substances from ambient air supplied to a vehicle cabin, comprising the steps of:

supplying ambient air to a first level connected to the vehicle cabin;

subjecting the ambient air supplied to the first level to a partial condensation to form condensates of the harmful substances;

separating the condensates from the ambient air by phase separation to form cooled clean air;

removing the condensates via a conduit; and supplying the clean air to the vehicle cabin.

2. The process of claim 1, wherein the subjecting to partial condensation comprises effecting a heat exchange by coupling the ambient air with cold air from an air conditioner cycle provided in the vehicle cabin.

3. The process of claim 1, further comprising warming the cooled clean air by indirect heat exchange with the ambient air to be partially condensed.

4. The process of claim 1, further comprising washing the loaded ambient air in a gas washing level operated with water prior to the partial condensation.

5. The process of claim 1, further comprising supplying the condensates to a container.

6. The process of claim 1, further comprising passing the clean air over a solid filter prior to supplying the clean air to the vehicle cabin.

7. The process of claim 1, further comprising passing the clean air over a moisture sensor prior to supplying the clean air to the vehicle cabin.

8. A process for removing harmful substances from ambient air supplied to a vehicle cabin, comprising the steps of:

supplying ambient air to a first level; subjecting the ambient air supplied to the first level to a first partial condensation to form first condensates of harmful substances;

separating the first condensates from the ambient air by a finest phase separation to form cooled clean air;

removing the first condensates via a first conduit;

supplying the cooled clean air to a second cleaning level;

effecting a second partial condensation of the cooled clean air to form second condensates of any residual harmful substances;

separating the second condensates from the cooled clean air by phase separation to form clean air;

removing the second condensates via a second conduit; and supplying the clean air to the vehicle.

9. The process of claim 8, wherein the subjecting to first partial condensation comprises effecting a heat exchange by coupling the ambient air with cold air from an air conditioner cycle provided in the vehicle cabin.

10. The process of claim 8, further comprising warming the cooled clean air by indirect heat exchange with the ambient air to be partially condensed.

11. The process of claim 8, further comprising washing the ambient air in a gas washing level operated with water prior to the first partial condensation.

12. The process of claim 8, further comprising supplying the first and second condensates to a container.

13. The process of claim 8, further comprising passing the clean air over a solid filter prior to supplying the clean air to the vehicle cabin.

14. The process of claim 8, further comprising passing the clean air over a moisture sensor prior to supplying the clean air to the vehicle cabin.

* * * * *